US008673383B2

(12) United States Patent
Neufeld

(10) Patent No.: US 8,673,383 B2
(45) Date of Patent: Mar. 18, 2014

(54) ROUGHAGE

(75) Inventor: Klaus Neufeld, Heiligenkreuz (AT)

(73) Assignees: Arnold Westerkamp, Visbek (DE); Helmut Grabherr, Kremsmuenster (AT)

( * ) Notice: Subject to any disclaimer, the term of this patent is extended or adjusted under 35 U.S.C. 154(b) by 626 days.

(21) Appl. No.: 12/514,588

(22) PCT Filed: Nov. 13, 2007

(86) PCT No.: PCT/EP2007/009791
§ 371 (c)(1),
(2), (4) Date: Jun. 20, 2011

(87) PCT Pub. No.: WO2008/058698
PCT Pub. Date: May 22, 2008

(65) Prior Publication Data
US 2011/0311681 A1    Dec. 22, 2011

(30) Foreign Application Priority Data
Nov. 13, 2006  (AT) ................... A 1875/2006

(51) Int. Cl.
| A23K 1/00 | (2006.01) |
| A23L 1/212 | (2006.01) |
| A23L 1/30 | (2006.01) |
| A23K 1/18 | (2006.01) |
| A23K 3/00 | (2006.01) |
| A21D 4/00 | (2006.01) |
| A23B 7/154 | (2006.01) |
| A23C 3/00 | (2006.01) |
| A23L 3/34 | (2006.01) |
| C12H 1/10 | (2006.01) |

(52) U.S. Cl.
USPC ............... 426/615; 426/2; 426/53; 426/54; 426/72; 426/321; 527/103

(58) Field of Classification Search
USPC ......................... 426/615; 527/103
See application file for complete search history.

(56) References Cited

U.S. PATENT DOCUMENTS

| 4,997,665 A | 3/1991 | Grethlein ............... 426/542 |
| 5,069,919 A | 12/1991 | Weibel ................... 426/261 |
| 5,705,216 A | 1/1998 | Tyson .................... 426/478 |
| 2006/0099322 A1 | 5/2006 | Schule et al. ............. 426/635 |

FOREIGN PATENT DOCUMENTS

| AT | 398685 | 12/1987 |
| DE | 2849341 | 5/1980 |
| DE | 10114341 | 10/2002 |
| EP | 0819787 | 1/1998 |
| FR | 2627668 | 9/1989 |
| JP | 200232855 | 8/2000 |
| WO | WO 8000120 | 2/1980 |

OTHER PUBLICATIONS

Chum et al., "Evaluation of Pretreatments of Biomass for Enzymatic Hydrolysis of Cellulose" US Department of Energy (Oct. 1985).*
"Typical Municpal Yard Waste Facility" Available online at www.ccpa.net on Sep. 27, 2004.*
"Growing Guide—Plume Poppy" Available online at www.gardening.cornell.edu on Mar. 19, 2007.*
Taylor "Planting Under a Tree". Fine Gardening 105, pp. 40-43, Sep./Oct. 2005.*
Chen et al., "Analysis of Alkaloids in Macleaya cordata (Willd.) R. Br. Using High-Performance Liquid Chromatography With Diode Array Detection and Electrospray Ionization Mass Spectrometry". Journal of Chromatography A. 1216 (2009) 2104-2110.*

* cited by examiner

*Primary Examiner* — Rena Dye
*Assistant Examiner* — Assaf Zilbering
(74) *Attorney, Agent, or Firm* — Jonathan Myers; Andrew Wilford

(57) ABSTRACT

The invention relates to dietary fiber for human and animal nutrition and more particularly to roughage consisting of a fiber formulation containing lignocellulose. Said formulation contains a fraction of a fibrous substance that is fermentable in the digestive tract and a fraction of a fibrous substance that is poorly or non-fermentable in the digestive tract.

26 Claims, No Drawings

ROUGHAGE

CROSS REFERENCE TO RELATED APPLICATIONS

This application is the US national phase of PCT application PCT/EP2007/009791, filed 13 Nov. 2007, published 22 May 2008 as WO2008/058698, and claiming the priority of Austrian patent application A1875/2006 itself filed 13 Nov. 2006, whose entire disclosures are herewith incorporated by reference.

The invention relates to additives for human and animal nutrition and more particularly to roughage.

The importance of roughage for human and animal health, digestive stability and well-being is indisputable. In the area of farm animal nutrition, this fact has been incorporated as part of an EU guideline in effect since Aug. 4, 2006 (for the Federal Republic of Germany: Federal Law Gazette, Volume 2006 Part I No. 37 §25(6)]. In all-purpose feed for pregnant gilts and sows, a crude fiber content of at least 8% on a dry basis is prescribed by this guideline. In any case, when feeding animals, care must be taken that an intake of at least 200 g of crude fiber per day is guaranteed up to one week before the farrow date.

The colloquial expression "roughage" is to some degree problematic. First of all, because the so-named feed components are not at all useless ballast as the expression suggests, and secondly since the material in question involves a complex group of substances with manifold physiological effects. A common characteristic is that they pass through the intestines undigested. All roughage materials are polysaccharides with the exception of lignin, a polymer of phenylpropane. However, the definition and further classification of roughage is inconsistent. According to the "biological" definition, roughage materials are carbohydrates that are not enzymatically decomposed in the small intestines and consequently reach the large intestines, plus lignin. This definition also encompasses the starch fraction that is not enzymatically decomposed in the small intestines (resistant starch), and is fermented by the flora in the large intestines, thus resulting in a biological effect in the large intestines. One "chemical" definition states as follows: roughage includes non starch polysaccharides ("structural carbohydrates" as they are called in German) plus lignin. The latter definition does not include the resistant starches, which results in the effect of such a starch fraction, which transfers to the colon, remaining unaccounted for.

If the origins of roughage are considered, it can be classified into the following: a) fibers designed to maintain plant structure, b) plant mucilage and c) stored polysaccharides. Roughage of an animal origin, such as cutine, is practically meaningless. The fact that roughage has some fibrous structure in it has led to the terms vegetable fiber, fiber and the increasingly popular term dietary fiber, as is used in the English language. Unfortunately, these terms are also confusing since not all roughage contains fibrous structures, as can be seen in the above list. Also worth mentioning is the term "crude fiber", which includes various structural materials that are insoluble in dilute acids and bases as determined through Weender analysis. The crude fiber fraction is usually much lower than the roughage fraction, with the ratio of these two values fluctuating depending on the feed composition. To understand the physiological effect, it makes sense to classify roughage into soluble/insoluble fractions and easily fermentable/difficult-to-ferment or totally impossible-to-ferment fractions.

The most common roughage components include cellulose, hemicelluloses, lignin, inulin, fructooligosaccharides and plant hydrocolloids.

Cellulose is the characteristic component of plant cell walls and determines the structure thereof for the most part. It is the most widespread macromolecule on earth. Cellulose is made up exclusively of 1,4-linked β-glucose units, being a high molecular weight polysaccharide with an un-branched chain-like molecular structure. Cellulose is water-insoluble and has a high water-binding capacity.

Hemicelluloses are polysaccharides consisting of pentoses (arabinose, xylose) and hexoses (glucose, mannose, galactose). Chain molecules form the base structure of hemicelluloses, these chain molecules, in contrast to cellulose, containing short side chains consisting of various sugars or sugar acid radicals, but which can also be slightly branched. The large amount of hydrophilic groups in hemicelluloses explains their strong ability to swell.

Lignin is a three-dimensional macromolecule that is constructed from phenylpropane units to form a polymeric compound. Lignin has far fewer polar groups than the polysaccharides and is therefore hydrophobic and not water-soluble.

Due to the high water-binding capacity of cellulose and hemicelluloses, they increase the volume stimulus in the intestines, which triggers peristalsis and accelerates passage through the large intestines. This is how they counteract constipation.

Inulin and fructooligosaccharides are polysaccharides that are formed from many plants and used as reserve material. Inulin and fructooligosaccharides are water-soluble.

Plant hydrocolloids such as pectin and locust bean gum [carob gum] are also included in the roughage group. They are water-soluble, gel-formers and as such increase the viscosity of the bolus. This increase in viscosity presumably causes delay in passage through the stomach and small intestines.

Fermentable roughage such as inulin, fructooligo-saccharides and pectin are quickly and almost completely decomposed in the colon by bacteria, since they are nutrition for intestinal flora. This in turn creates short-chained fatty acids, primarily acetic acid, propionic acid and butyric acid, which have positive effects on the intestinal tract and overall health of the animal. These short-chained fatty acids lower the pH value of the ingesta, thereby stabilizing the flora of the large intestines, preventing bacterial migration of pathogenic microbes to areas of the large intestine, and thereby guarding against diarrheic illnesses. In addition, these short-chained fatty acids stimulate reabsorption of sodium and water from the colon. This is another mechanism that is a prophylactic against diarrhea. The butyric acid that is formed acts as an energy-supplying substrate for the cells of the mucous membrane of the large intestine, thereby promoting the regenerative capacity of the mucous membrane and keeping it healthy. The lowering of the pH as described, and the influence on the intestinal flora causes the concentration of ammonia in the large intestine to decrease. This is very important for intestinal health since ammonia is a highly toxic metabolic product that causes inflammation and cell damage that can result in permanent damage to the intestinal epithelium. The damaging effect of ammonia is also not limited to the intestinal tract; ammonia extends to the entire organism and can thus damage other organs as well. It is also worth mentioning that the short-chained fatty acids that arise from the fermentation process make their way to the bloodstream and are available to the animal as an additional useful energy source.

Roughage is of great practical important in general for both animal as well as human nutrition. Usually, it is assumed that roughage accelerates the time of passage in the intestinal tract. However, this only applies to the area of the large intestines, whereas in the stomach and small intestines the time of passage is not affected or is even slowed. Both soluble and insoluble roughage is described as being capable of reducing the emptying frequency of the stomach. The scientific literature mentions that this has a positive effect on protein digestion due to the longer time for stomach acids and enzymes to take effect.

To maintain a healthy intestinal environment, it is important to combine fermentable and less-fermentable roughage.

In practice, in particular for animal nutritional purposes, frequently used crude fiber substrates include wheat bran, dry forage, dried greens and crude fiber products comprised of lignocellulose.

Wheat bran is characterized by its low energy content with a relatively high crude fiber content. The percentage of bacterially fermentable roughage is also high. Due to its high phosphorous content and low calcium content, wheat bran is a suitable crude fiber substrate in support of MMA prophylaxis (i.e. mastitis-metritis-agalactia prophylaxis) in sows during the birth preparation phase, for example. Nevertheless, wheat bran can be heavily laden with mycotoxins, which are known to lead to health problems.

Dry forage also has a high crude fiber content and large percentage of bacterially fermentable roughage. The moist, slimy droppings in swine caused by dry forage feed and the high calcium content, which promotes urinary tract infections due to an increase in the urine pH and thus promotes the occurrence of MMA, are detrimental to the birth preparation process. Therefore, the use of dry forage in large amounts is somewhat problematic with respect to breeding sows.

Dried greens have a low energy content and high crude fiber content, and have a high percentage of bacterially fermentable roughage. Mycotoxin exposure is possible.

Recently, crude fiber products comprised of lignocellulose have been proven useful to farm animal nutrition. Lignocellulose is understood to mean cellulose and hemicelluloses with stored lignin in it, in other words lignified plant material. The advantages of these products are their standardized crude fiber content, the fact that they are free of mycotoxins and their thermal hygienization in the production process.

Use of these crude fiber products has already proven useful in sow feed. A high crude fiber content leads to good satiation stimulus, which has a calming influence on the behavior of animals as a result. It is well documented that these crude fiber products comprised of lignocellulose help to counteract obstipation due to the accelerated passage through the large intestine and thus contribute significantly to MMA prophylaxis without exposing the animals to the risk of mycotoxin exposure, which is the case in other crude fiber substrates.

The use of wood or wood flours in animal nutrition is a well-known method. In EP 1 542 545 B1, a feed additive is disclosed that consists of a so-called crude fiber concentrate of "fibrillated" lignocellulose. The use of cellulose fibrils in feed is described in EP 0 819 787 A2.

The lignocellulose-based crude fiber products currently being marketed consist of insoluble, difficult-to-ferment roughage. However, from a nutritional-physiological point of view, it is important to use a combination of difficult-to-ferment or unfermentable roughage and fermentable roughage. Fermentable roughage results in the formation of organic acids in the intestines, in particular lactic acid, as well as volatile fatty acids, with butyric acid being of greatest importance to the metabolism of villi and for water reabsorption in the intestines. However, excess intake of fermentable fibrous substances (roughage) results in a worsening of the stool consistency and significant gas build-up in the lumen of the intestines. An increase in gas build-up is considered adverse to farm animals from an energetic point of view since it results in a loss of energy.

Thus, it is not possible to achieve an optimum effect on the metabolic activity or digestive health of the organism either through the sole use of fermentable fibrous substances or through the sole use of difficult-to-ferment or unfermentable fibrous substances as roughage; rather, a balanced combination of these elements is necessary.

The invention proposes an improved roughage that comprises a lignocellulosic fiber formulation containing a portion of fibrous substance that is fermentable in the intestinal tract and a portion of fibrous substance that is difficult-to-ferment or unfermentable in the intestinal tract.

A fibrous substance that is fermentable in the intestinal tract is understood to mean fibrous substances that are partially or wholly decomposed microbially in the intestinal tract, resulting in the formation of acids. Fibrous substances that are difficult-to-ferment or unfermentable in the intestinal tract are understood to mean fibrous substances that are not microbially decomposed, or else slowly or with difficulty, in the intestinal tract of animals with single-chamber stomachs (monogastric organisms) and in humans. In expert circles, it is commonly assumed that fibrous substances that are difficult-to-ferment or unfermentable are insoluble, whereas easily fermentable fibrous substances are soluble.

The ratio between the fermentable and difficult-to-ferment or unfermentable fraction can vary within a wide range in the roughage according to the invention, depending on the application. The ratio can be between 1:100 and 100:1, for example.

According to the invention, the lignocellulosic material can be used in unprocessed form or in processed form. The lignocellulosic material according to the invention can be used in purified and prepared form.

According to one feature of the invention, the roughage according to the invention can contain a lignocellulosic material that is made up of one portion of fibrous substance that is fermentable in the intestinal tract and one portion that is difficult-to-ferment or unfermentable in the intestinal tract.

Possible raw materials for such a roughage according to the invention can include barks from softwoods, barks from hardwoods and the wood from larches (*Larix* spp.), for example. Preferred bark material according to the invention includes such materials from pines (*Pinus* spp.), for example.

Other raw materials that are easily fermented in the intestinal tract can be used as fermentable fiber components, such as oligosaccharides, pectins, inulin and plant material that contains these fermentable fibrous substances, such as chicory, topinambur, etc.

According to another feature of the invention, the roughage according to the invention can contain bark material that is selected from the group consisting bark material from softwoods, bark material from hardwoods or mixtures thereof. A preferred roughage according to the invention can contain bark material from pines.

According to another feature of the invention, the roughage according to the invention can contain larch wood.

According to another feature of the invention, the roughage according to the invention can contain larch wood and bark material from softwoods and/or bark material from hardwoods. A preferred roughage according to the invention can contain bark material from pines and larch wood.

According to another feature of the invention, the roughage according to the invention can comprise a mixture of
- at least one lignocellulosic raw material that comprises a portion of fibrous substance that is fermentable in the intestinal tract, and
- at least one lignocellulosic raw material that comprises a portion of fibrous substance that is difficult-to-ferment or unfermentable in the intestinal tract.

As contemplated by the present invention, possible raw materials with primarily unfermentable fibrous substance include hardwoods and softwoods but also other plant components containing difficult-to-ferment or unfermentable plant fibers (lignocelluloses such as reeds, straw, etc.).

According to another feature of the invention, the roughage can comprise at least one wood selected from the group consisting of softwood, hardwood and mixtures thereof and at least one bark material selected from the group consisting of bark material of softwoods, bark material of hardwoods and mixtures thereof.

According to another feature of the invention, the roughage can comprise a softwood selected from the group consisting of spruce wood (*Picea* spp.), pine wood (*Pinus* spp.), larch wood (*Larix* spp.) and mixtures thereof and a bark material selected from the group consisting of bark material of softwoods, bark material of hardwoods and mixtures thereof.

According to another feature of the invention, the roughage according to the invention can comprise a softwood selected from the group consisting of spruce wood, pine wood, larch wood and mixtures thereof and a bark material of pines.

According to another feature of the invention, the roughage according to the invention can comprise a bark material selected from the group consisting of bark material of softwoods, bark material of hardwoods and mixtures thereof and at least one hardwood. For example, according to the invention beech (*Fagus* spp.), poplar (*Populus* spp.), birch (*Betula* spp.) and the like can be used in the hardwood component. According to a preferred embodiment of the invention, the roughage comprises bark material of conifers and a hardwood selected from beech, poplar, birch and mixtures thereof.

According to another feature of the invention, the roughage can comprise a mixture of larch wood and other softwoods.

According to another feature of the invention, the roughage can comprise larch wood and a softwood selected from the group consisting of spruce wood, pine wood and mixtures thereof.

According to another feature of the invention, the roughage can comprise a mixture of larch wood and at least one hardwood. For example, according to the invention beech, poplar, birch and the like can be used in the hardwood component.

According to a particularly preferred embodiment of the invention, the roughage can comprise a mixture of bark material, preferably pine bark, with larch wood and at least one other softwood, in particular spruce wood and/or pine wood.

According to another particularly preferred embodiment of the invention, the roughage can comprise a mixture of bark material, preferably pine bark, with a mixture of pine wood and spruce wood.

According to another feature of the invention, the roughage can comprise isoquinoline alkaloids, in particular benzophenanthridine alkaloids. The alkaloids can be comprised in the form of plant materials, such as rhizomes, leaves, stems and the like.

For example, papaveraceae plant materials can be used for the present invention. Possible especially preferred plants can include *sanguinaria canadensis, macleaya cordata, chelidonium majus, hydrastis canadensis*, etc., for example. The papaveraceae contain isoquinoline alkaloids, in particular benzophenanthridine alkaloids such as sanguinarine and chelerythrine.

According to the invention, extracts of plant materials can also be included, such as those of *sanguinaria canadensis* or *macleaya cordata* or from other papaveraceae. According to a preferred embodiment of the invention, extracts of *macleaya cordata* are used.

Suitable plant material extracts according to the invention can be obtained through any known extraction process, such as aqueous extraction, alcoholic extraction, $CO_2$ extraction and the like.

According to the invention, the roughage can comprise salts or derivatives of isolated isoquinoline alkaloids or their synthetic analogs.

The roughage according to the invention is preferred to comprise benzophenanthridine alkaloids, in particular sanguinarine and chelerythrine, wherein the dosage of sanguinarine can vary between 0.00001 wt.-% and 50 wt.-% of the overall weight of the roughage, for example. According to a preferred embodiment, the ratio of sanguinarine to chelerythrine can be about 2:1.

Benzophenanthridine alkaloids are known for their performance-enhancing and appetite enhancing effect in animals. Surprisingly, an increase in satiation stimulus was achieved with an alkaloid-containing roughage according to the present invention. This effect is particularly important in breeding sows. It is also of interest for other animals, in particular dogs and cats, for which the roughage according to the invention can be used to dampen appetite, particularly in connection with prophylaxis and treatment of obesity. However, the roughage according to the invention can even be successfully used for domestic pets of normal weight; these animals can often be quite annoying to owners due to their appetency to food (begging).

The present invention also pertains to a method of preparing roughage according to the invention.

According to one feature of the invention, the method can comprise the following steps:
(a) Cleaning the components of the roughage, which are selected from the group consisting of bark material from hardwoods, bark material from softwoods, larch wood, softwoods, hardwoods and mixtures thereof, and removal of foreign fractions,
(b) Drying the components to a dry matter fraction of about 3 to 12%,
(c) Comminution of the components and if necessary screening to a desired particle size,
(d) Compacting of the individual components,
(e) Crumbling the components in a crumbler to the desired particle size and then mixing the components.

According to another features of the invention, prior to compacting in step (d) at least one of the components can be admixed with a plant material containing isoquinoline alkaloids or an isoquinoline alkaloid extract can be sprayed onto at least one of the components.

According to another feature of the invention, when the crumbled components are mixed in step (e) a plant material containing isoquinoline alkaloids can be admixed or an isoquinoline alkaloid extract can be sprayed thereon.

According to another feature of the invention, the method can comprise the following steps:
(i) Cleaning the components of the roughage, which are selected from the group consisting of bark material from hardwoods, bark material from softwoods, larch wood, softwoods, hardwoods and mixtures thereof, and removal of foreign fractions,
(ii) Drying the components to a dry matter fraction of about 3 to 12%, (iii) Comminution of the components and if necessary screening to a desired particle size,
(iv) Mixing the comminuted and if necessary screened components,
(v) Compacting the mixture and then crumbling the components in a crumbler to the desired particle size.

According to another feature of the invention, when the components are mixed in step (iv) a plant material containing isoquinoline alkaloids can be admixed or an isoquinoline alkaloid is extract can be sprayed thereon.

According to another feature of the invention, a plant material containing isoquinoline alkaloids can be admixed with the crumbled mixture from step (v) or an isoquinoline alkaloid extract can be sprayed thereon.

According to another embodiment of the invention, a feed material can be provided that comprises a roughage as defined above. The feed material comprises at least one feed component selected from the group consisting of protein substrates, carbohydrate substrates, raw feed, green fodder preserves (silage), fats, vitamins, minerals, and trace elements. Examples of carbohydrate substrates can include grain, grain products, corn and the like. Examples of protein substrates can include meat and bone meals, soy products, lactoproteins, rapeseed products such as rape cake or rape meal, and the like. Examples of raw feed contained in feed materials for ruminants, rodents and types of hares, for example, can include hay, straw and the like, and moreover all types of silage.

The amount of roughage according to the invention in the feed material can vary within a wide range. According to the invention, the feed material can contain 0.01 to 50 wt.-% of roughage based on the total weight of the feed material.

According to another feature of the invention, a feed material additive can be provided to prepare a feed material as defined above, wherein the feed material additive comprises a roughage according to the invention.

According to another feature of the invention, a feed material premixture can be provided to prepare a feed material as defined above, wherein the feed material premixture comprises a roughage according to the invention. Possible feed material premixtures include supplemental feed material as well. Up to >99% roughage according to the invention can make up such feed material premixtures or supplemental feed materials.

According to the invention, the feed material or feed material additive or feed material premixture to prepare a feed material comprises an isoquinoline alkaloid-containing roughage according to the invention, said roughage being use to reduce appetite, increase satiation stimulus and if necessary for weight reduction.

The roughage according to the invention can be mixed into a conventional animal feed substance either in powdered, granulated or crumbled form. The roughage can also be designed in the form of a chew object, such as chew bones. In the process, the roughage according to the invention can be used by itself or together with conventional feed material components such as protein substrates, carbohydrate substrates, oils, fats, vitamin substrates, mineral substrates, technical additives, etc.

The present invention is explained in detail below with the aid of examples.

EXAMPLE 1

Preparation of a roughage according to the invention Raw materials used include pine bark, larch wood and spruce wood or pine wood or a mixture of spruce wood and pine wood at a ratio of about 30% pine bark, about 20% larch wood and about 50% spruce wood or pine wood or spruce wood-pine wood mixture. The raw materials are cleaned and foreign fractions removed, and then dried to a dry matter fraction of 10% and comminuted. If necessary, screening to a desired grain size can be done. Then, the individual components are compacted, crumbled in a crumbler to the desired particle size and then mixed together.

Alternatively, the ground starting components can be mixed together prior to compacting.

If necessary, an isoquinoline alkaloid extract is sprayed thereon or plant material that contains isoquinoline alkaloid is mixed in. A soluble form of the extract can also be finally sprayed onto the finished product.

EXAMPLE 2

Preparation of a roughage according to the invention Spruce wood or a spruce wood-pine wood mixture is used together with pine bark at a mixture ratio of 1:1. Processing is done as in Example 1.

EXAMPLE 3

Preparation of a roughage according to the invention 100% pine bark is used as the raw material. Processing is done as in Example 1.

EXAMPLE 4

Preferred Formulations of the Roughage According to the Invention

Formulation 1:
50% of the product consists of spruce wood or pine wood or a mixture thereof, 30% of the product consists of pine bark and 20% consists of larch wood.

The woods and the barks are ground as follows, for example: 0% of particles are >0.28 mm, 4-8% of particles are >0.20 mm, 52-68% of particles are >0.08 mm, 20-32% of particles are <0.08 mm.

The components are mixed and then used as a flour product.

Formulation 2:
The proportions of barks and woods are the same as that in Formulation 1.

The ingredients of the formulation are compacted and then crumbled, and it makes no difference whether the components are mixed before or after compacting or even not until the end of the production process, i.e. in already crumbled form. The compacted and crumbled product can have the following particle size distribution, for example: 0% of particles are >2.0 mm, 60-63% of particles are >1.0 mm, 32-34% of particles are >0.5 mm, 5-70 of particles are <0.5 mm.

Formulation 3:
The portions of barks and woods are the same as in Formulation 1.

The ingredients of the formulation are compacted and then crumbled. The components can be mixed before or after compacting or even not until the end of the production process, i.e. in already crumbled form The compacted and crumbled product can have the following particle size distribution, for example: 0% of particles are >8.0 mm, 78-83% of particles are >3.15 mm, 15-18% of particles are >2.0 mm, 0-1% of particles are <2.0 mm.

The three formulations of the roughage according to the invention can have a moisture content of 8.5-9.3%, for example. All three formulations are further characterized in that they have a liquid binding capacity that corresponds to at least 5 times their own weight. Furthermore, all three formulations have a total dietary fiber content of 85% (tdf).

The very high total dietary fiber (tdf) content as described is especially good from a nutrition-physiological point of view and cannot be accomplished in this form with any of the roughage substrates known from the prior art. One trained in the art assumes from the prior art that fibrous formulations based on lignocellulose are not fermented, or are fermented only to a small extent, in the intestinal tract of animals with single-chamber stomachs. Therefore, it is surprising that roughage formulations according to the invention comprising lignocellulosic material in the combinations set forth according to the invention are fermented in the intestinal tract, resulting in a massive generation of organic acids, in particular lactic acid, far in excess of the values obtained from conventional crude fiber substrates.

EXAMPLE 5

Lactic Acid Generation Capacity of Roughage According to the Invention

In a test, various formulations of the roughage according to the invention were incubated together with the blind gut contents of poultry in an in vitro testing system, and the influence of different fibrous products on lactic acid generation capacity, the generation of volatile fatty acids and other parameters was investigated. As expected, this test determined that conventional products based on lignocelluloses rarely resulted in the generation of lactic acid, which is why they are considered to be difficult-to-ferment, or non-fermentable fibrous substances, as one trained in the art knows.

Surprisingly, the results obtained from various roughage formulations according to the invention showed an increase in lactic acid production of up to nearly 30 times that of conventional lignocellulose products. The results are summarized in Table 1 below:

TABLE 1

|  | Average measured value D-Lactate in mg/l | Fermentation - D-Lactate generation in mg/l (measured value minus zero) |
|---|---|---|
| Zero | 2.25 |  |
| Lignocellulose | 3.85 | 1.60 |
| Invention 1* | 21.90 | 19.65 |
| Invention 2* | 47.10 | 44.85 |
| Invention 3* | 48.50 | 46.25 |
| Invention 4* | 34.50 | 32.25 |
| Feed | 14.00 | 11.75 |
| Corn Starch | 31.90 | 29.65 |
| Beet Slices | 8.52 | 6.27 |
| Citrus Fiber | 9.32 | 7.07 |
| Fruit Fiber 1 | 16.50 | 14.25 |
| Fruit Fiber 2 | 3.07 | 0.82 |

*Invention 1: roughage according to the invention comprising larch wood + larch bark;
Invention 2: roughage according to the invention comprising pine bark;
Invention 3: roughage according to the invention comprising hardwood + hardwood bark;
Invention 4: roughage according to the invention comprising 20% larch wood + 30% pine bark + 50% spruce wood + pine wood.

From a nutrition-physiological point of view, the lactic acid generated is very important since it results in a protective effect against certain microbes, in particular pathogenic microbes, in the intestinal lumen. An especially important effect of the roughage according to the invention can be explained by the fact that lignocellulosic substances result in a surface accumulation of such pathogenic microbes due to the adsorptive effect of the substances; these microbes can then be deactivated or their multiplication can be restricted by means of the locally increased lactic acid production in the roughage particles. For example, bacteria such as coli bacteria, clostridia, etc. attach to the roughage particles. Especially the lactic acid bacteria are promoted by the fermentable portion of the material. They generate lactic acid and the lactic acid surrounds the roughage particles. This produces a very localized lactic acid halo around the particles so that the pathogenic or damaging microbes accumulated there are counteracted. This particularly advantageous effect of the present invention is not observed in roughages of the prior art.

Moreover, lignocellulosic substances are adsorbents for various pollutants, in particular ammonia. As a result of the local influence of the acid, this ammonia is converted to the non-toxic ammonium ion after its attachment. This is very important for general animal health, intestinal health in particular, but also for general barn climate.

EXAMPLE 6

Composition of a Preferred Roughage According to the Invention

The analysis of the roughage according to the invention, comprising 20% larch wood, 30% pine bark and 50% spruce wood+pine wood (Formulation 1 in Example 4, "Invention 4" of Table 1 of Example 5), yields the product specification listed in the following Table 2 (data given in %):

TABLE 2

| Crude fiber | 53 ± 2 |
|---|---|
| TDF (total dietary fiber) | 85 ± 2 |
| ADL (acid detergent lignin) | 30 ± 2 |
| Crude protein | 1.0 |
| Crude ash | 1.6 |
| Crude fat | 0.7 |
| Moisture | 9 ± 1 |

The roughage formulation according to the invention is a combination of fermentable and difficult-to-ferment or non-fermentable fibrous substances, said combination being favorable from a nutritional-physiological point of view; this combination results on the one hand in the non-fermentable fibrous portion shifting the fermentation process of the fermentable food fraction to regions of the intestinal lumen where the volatile fatty acids produced, in particular butyric acid, can be put to use primarily for energetic metabolism of the intestinal epithelium and for water reabsorption and not just act as an energy substrate for the body through reabsorption. Tests with the roughage according to the invention have shown that the water reabsorption in the intestinal lumen is optimized, thus increasing the dry matter fraction in the stool.

As part of diarrhea prophylaxis in piglets, a clear improvement in stool consistence has been shown. In comparison with conventional formulations comprised of lignocelluloses, the fibrous formulation according to the invention results in a further improvement in effectiveness, expressed on the one hand in an improvement in stool dry fraction as a result of optimized water reabsorption. This is especially important in piglets and poultry, but also in an optimized satiation stimulus in sows or even domestic animals such as dogs and cats; this satiation stimulus can even be accomplished at lower concentrations than in conventional lignocellulose products. Moreover, the decrease in the production of ammonia leads to a lower occurrence of inflammation in the colon, which also has a positive effect on the water reabsorption (a damaged mucous membrane cannot reabsorb enough water) and overall a positive effect on the health of the animals. In addition, the accelerated colon passage makes it more difficult for pathogenic microbes to ascend to the small intestine.

In numerous studies of broilers and turkey hens, a much more positive effect on the stool dry matter fraction was found. The stool dry matter fraction of the test group was up to 20% higher in comparison to the control group by fattening periods or phases. This understandably had a positive effect on the litter quality and as a consequence on general health. In these practical studies, considerable savings were achieved in the area of treatment and litter costs.

The feed according to the invention is of considerable importance especially in breeding sows since in this application feeding is limited due to MMA prophylaxis (metritis-mastitis-aglactia), whereas the satiation stimulus of the animal should still be satisfied. This is usually achieved by increasing the intake of crude fiber, but recently lignocellulose-based crude fiber formulations have frequently been used. The usual dosage for lignocellulose products in satiation feeding of breeding sows is about 4-5%. These necessarily high dosages are satisfactory neither from an economical point of view nor from a nutritional-physiological point of view since this leads to a decreased intake of other important nutrients. Interestingly, a significant improvement in satiation stimulus was achieved using the roughage according to the invention, in particular using the formulation with a high proportion of pine bark or pine bark alone, even at much lower dosages than the 4-5% listed for the usual lignocellulose products. This is presumably due to the combined effect of the roughage according to the invention since the lactic acid generated leads to an optimization of the satiation stimulus due to its hydrogen ion content.

EXAMPLE 7

Feed Recommendations for the Roughage According to the Invention from Example 6

Table 3 below provides examples of the roughage content according to the invention from Example 6 in the feed during the feeding of various farm animals.

TABLE 3

| (Roughage content indicated in % of the ration) | |
|---|---|
| Pregnant breeding sows: rationed feedung | 2-3 |
| satiation feeding (ad lib.) | 2-5 |
| Fattened pigs | 0.5-1.5 |
| Piglets | 1-2 |
| Broilers | 0.5-1.5 |
| Turkey hens | 1-2 |
| Rabbits | 2-5 |

Table 4 below shows an example of a ration with the roughage according to the invention from Example 6 in the raising of piglets:

TABLE 4

| 4% | Mineral/active ingredient mixture |
|---|---|
| 22% | Soy grits |
| 24.5% | Barley |
| 15% | Wheat |
| 28% | Corn |
| 5% | Whey fat concentrate |
| 1.5% | Roughage according to the invention |

Table 5 below shows an example of a ration with the roughage according to the invention from Example 6 in a feed for pregnant breeding sows:

TABLE 5

| 39% | Barley |
|---|---|
| 10% | Corn |
| 10% | Wheat |
| 11% | Rapeseed grits or sunflower grits |
| 15% | Wheat feed meal |
| 5% | Wheat bran |
| 5% | Dry forage |
| 3% | Mineral/active ingredient mixture |
| 2% | Roughage according to the invention |

Table 6 below shows an example of a ration with the roughage according to the invention from Example 6 in a feed for fattened pigs:

TABLE 6

| 60% | Whole grain silage or grain corn silage |
|---|---|
| 17.5% | Wheat |
| 18% | Soy grits |
| 3% | Mineral/active ingredient mixture |
| 1.5% | Roughage according to the invention |

Table 7 below shows an example of a ration with the roughage according to the invention from Example 6 in rabbit feed:

TABLE 7

| 20% | Alfalfa meal |
|---|---|
| 10% | Sunflower grits |
| 15% | Soy grits |
| 30% | Barley |
| 3% | Mineral/active ingredient |
| 10% | Wheat bran |
| 8% | Wheat feed meal |
| 4% | Roughage according to the invention |

Table 8 below shows an example of a ration with the roughage according to the invention from Example 6 in fattened broiler feed.

TABLE 8

| 50% | Corn |
|---|---|
| 9% | Wheat |
| 32% | Soy grits |
| 3% | Mineral/active incredient mixture |
| 5% | Oil/fat |
| 1% | Roughage according to the invention |

Table 9 below shows an example of a ration with the roughage according to the invention from Example 6 in a feed for fattened calves:

TABLE 9

| 99% | Mixed milk replacement drink for calves |
|---|---|
| 1% | Roughage according to the invention |

According to another embodiment of the invention, the roughage according to the invention can be used as a food additive in human food. The roughage according to the invention can be contained in particular in dietary food. For example, the use of the roughage according to the invention in food can bring about an appetite reduction and/or increase in satiation stimulus and therefore support weight reduction.

The invention claimed is:

1. A lignocellulosic fiber roughage formulation, which comprises a mixture of:
   (a) at least one comminuted lignocellulosic raw material comprising one portion of fibrous substance that is fermentable in the intestinal tract of a human or animal with a single-chamber stomach, said material comprising at least one bark material selected from the group consisting of bark material from softwoods, bark material from hardwoods, and mixtures thereof and
   (b) at least one comminuted lignocellulosic raw material that comprises a portion of fibrous substance that is more difficult-to-ferment than said fermentable fibrous substance or that is unfermentable in the intestinal tract of a human or animal with a single-chamber stomach, said material comprising at least one wood selected from the group consisting of softwood, hardwood, and mixtures thereof,
   wherein the fermentable fibrous substance and the fibrous substance that is more difficult-to-ferment than said fermentable fibrous substance or that is unfermentable are present in a ratio between 1:100 and 100:1,
   wherein 0% of said comminuted lignocellulosic raw materials have a particle size greater than 2 mm.

2. The lignocellulosic fiber roughage formulation according to claim 1, which comprises a softwood selected from the group consisting of spruce wood, pine wood, larch wood and mixtures thereof and a bark material selected from the group consisting of bark material from softwoods, bark material from hardwoods and mixtures thereof.

3. The lignocellulosic fiber roughage formulation according to claim 2, which comprises a softwood selected from the group consisting of spruce wood, pine wood, larch wood and mixtures thereof and a bark material from pines.

4. The lignocellulosic fiber roughage formulation according to claim 1, which comprises a mixture of larch wood and other softwoods.

5. The lignocellulosic fiber roughage formulation according to claim 4, which comprises larch wood and another softwood selected from the group consisting of spruce wood, pine wood, and mixtures thereof.

6. The lignocellulosic fiber roughage formulation according to claim 1, which comprises a bark material that is selected from the group consisting of bark material from softwoods, bark material from hardwoods and mixtures thereof and at least one hardwood.

7. The lignocellulosic fiber roughage formulation according to claim 6, which comprises a bark material that is selected from the group consisting of bark material from softwoods, bark material from hardwoods and mixtures thereof and hardwood selected from beech, poplar, birch and mixtures thereof.

8. The lignocellulosic fiber roughage formulation according to claim 1, which comprises larch wood and at least one hardwood.

9. The lignocellulosic fiber roughage formulation according to claim 8, which comprises larch wood and a hardwood selected from beech, poplar, birch and mixtures thereof.

10. The lignocellulosic fiber roughage formulation according to claim 1, which comprises an isoquinoline alkaloid.

11. The lignocellulosic fiber roughage formulation according to claim 10, wherein the isoquinoline alkaloid is a benzophenanthridine alkaloid.

12. The lignocellulosic fiber roughage formulation according to claim 10, wherein the isoquinoline alkaloid is contained in a plant part selected from the group consisting of rhizomes, leaves, and stems, or in an extract of said plant part or as a salt or derivative of the isoquinoline alkaloid or in the form of a synthetic analog of the isoquinoline alkaloid.

13. The lignocellulosic fiber roughage formulation according to claim 12, wherein the isoquinoline alkaloid is contained in a plant part of papaveraceae.

14. The lignocellulosic fiber roughage formulation according to claim 12, wherein the isoquinoline alkaloid is contained in the form of an extract of a plant part of papaveraceae.

15. The lignocellulosic fiber roughage formulation according to claim 13, wherein the papaveraceae plant part is from a plant selected from the group consisting of sanguinaria canandensis, macleaya cordata, chelidonium majus, hydrastis canadensis and mixtures thereof.

16. The lignocellulosic fiber roughage formulation according to claim 10, which comprises sanguinarine or chelerythrine or a mixture thereof as the isoquinoline alkaloid.

17. The lignocellulosic fiber roughage formulation according to claim 16, wherein sanguinarine is contained in the formulation in an amount of 0.00001 wt.-% to 50 wt.-%, based on the total weight of the roughage.

18. The lignocellulosic fiber roughage formulation according to claim 16, wherein in the mixture of sanguinarine and chelerythrine, the sanguinarine and chelerythrine are contained at a ratio of about 2:1.

19. A method of preparing a lignocellulosic fiber roughage formulation, as defined in claim 1, which comprises the following steps:
   (a) cleaning the components of the roughage and removing foreign fractions,
   (b) drying the components,
   (c) comminuting the components and if necessary screening to a desired particle size, and either
   (d1) compacting the individual components, crumbling the components to the desired particle size, and then mixing the components, or
   (d2) mixing the comminuted components, which are optionally sieved, compacting the mixture and then crumbling it to a desired particle size.

20. An animal feed which comprises the lignocellulosic fiber roughage formulation according to claim 1, said animal feed further comprising at least one feed component selected from the group consisting of protein substrates, carbohydrate substrates, raw feed, green fodder preserves (silage), fats, vitamins, minerals and trace elements.

21. The animal feed according to claim 20, in which the lignocellulosic fiber roughage formulation which is present in said animal feed is present in an amount of between 0.01 and 50 wt. %, based on the total weight of the feed.

22. The An animal feed premixture which comprises the lignocellulosic fiber roughage formulation according to claim 1, said animal feed premixture further comprising at least one feed component selected from the group consisting of protein substrates, carbohydrate substrates, raw feed, green fodder preserves (silage), fats, vitamins, minerals and trace elements.

23. The animal feed premixture according to claim 22 which comprises the lignocellulosic fiber roughage formulation in an amount making up to >99% of the animal feed premixture.

24. The lignocellulosic fiber roughage formulation according to claim 1 which is used for providing dietary roughage to a human in need thereof.

25. The lignocellulosic fiber roughage formulation according to claim 10 which is used for one or more of the purposes of appetite reduction, increasing satiation stimulus, or weight reduction.

26. The lignocellulosic fiber roughage formulation according to claim 1 wherein the formulation has a moisture content of 8.5 to 9.3%.

\* \* \* \* \*

UNITED STATES PATENT AND TRADEMARK OFFICE
CERTIFICATE OF CORRECTION

PATENT NO.        : 8,673,383 B2                                                                Page 1 of 1
APPLICATION NO.   : 12/514588
DATED             : March 18, 2014
INVENTOR(S)       : Klaus Neufeld It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1297 days.

Signed and Sealed this

Twenty-ninth Day of September, 2015

Michelle K. Lee
*Director of the United States Patent and Trademark Office*